Oct. 23, 1962

P. PINO 3,060,228

PREPARATION OF METHYL ACRYLATE

Filed Feb. 1, 1962

Oct. 23, 1962  P. PINO  3,060,228
PREPARATION OF METHYL ACRYLATE
Filed Feb. 1, 1962   3 Sheets-Sheet 3

FLOW SHEET
OF
RECTIFICATION PROCEDURES FOR THE RECOVERY OF METHYL ACRYLATE

United States Patent Office 3,060,228
Patented Oct. 23, 1962

3,060,228
PREPARATION OF METHYL ACRYLATE
Piero Pino, Pisa, Italy, assignor to Lonza Electric and Chemical Works, Limited, Basel, Switzerland
Filed Feb. 1, 1962, Ser. No. 170,577
Claims priority, application Switzerland Feb. 6, 1961
5 Claims. (Cl. 260—486)

The invention relates to the catalytic synthesis of methyl acrylate from acetylene, carbon monoxide and methanol.

Such synthetic preparation method has been described, for instance, in Swiss Patent No. 285,125, where the reaction is carried out at elevated pressures above 50 atm.; as reaction medium, a liquid is used in which the acetylene is soluble, whereby care has been taken that the acetylene in the gas phase has a low partial pressure. The formed methyl acrylate is then isolated from the obtained ester mixture. The yields obtained, calculated on acetylene, are not more than 26% The remainder of the acetylene is converted to a mixture of diesters and keto esters which has little utility.

Other known methods which produce higher yields, use large amounts of volatile toxic metal carbosyl compounds, for instance nickel carbonyl, and strong acids, such as hydrochloric acid, and require expensive procedures for the recovery of the catalysts.

It has also been proposed to prepare from the recited starting materials alpha, beta-unsaturated carboxylic acids and derivatives thereof by adding organic compounds having a high dielectric constant, such as acetonitrile, to the liquid reaction mixture.

It is the principal object of this invention to provide an improved process for the preparation of methyl acrylate where high yields of the acrylate are obtained, calculated on acetylene. A further object is to provide a process for recovering pure methyl acrylate which contains less than 1 percent of methyl propionate, from the reaction mixture.

The above and other objects are obtained by carrying out the reaction in a liquid which contains at most 0.5 mole of acetylene in 1 liter of methanol and 1 to 10, preferably 1 to 2 parts by weight per thousand, of dicobalt octacarbonyl $[Co(CO)_4]_2$. The acetylene is dissolved in methanol which contains the catalyst, until the desired concentration is reached, and then the carbon monoxide is introduced under pressure. In this way, I avoid the risk of explosions which may occur when mixtures of carbon monoxide and acetylene are compressed to high pressures. The mixture is then heated to reaction temperature. The thus obtained reaction product consists in a dilute methylacrylate solution, from which the methylacrylate is isolated by rectification. Instead of the preferred dicobalt octacarbonyl, iron pentacarbonyl may be used, and instead of preferred using an excess of methanol, a suitable hydrocarbon solvent for the catalyst and acetylene, such as benzene, isooctane, n-heptane, may be employed.

The reaction is preferably carried out at temperatures between 80 to 200° C. and under pressures of about 50 to 500 atmospheres.

When the rectification procedures are carried out under normal pressure (760 mm. Hg), it is surprising to find that the catalyst dissolved in methanol retains its activity unchanged if the methyl acrylate is separated from the excess methanol and catalyst in a carbon monoxide medium. Therefore, it is possible to repeat the synthesis many times with the same catalyst, by using solutions of the catalyst in methanol from which the methyl acrylate was essentially removed; or the process may be carried out in continuous operation by recycling the end product of the rectification.

In this way, there is substantially no loss of catalyst, and the synthesis may be carried out continuously by adding acetylene, carbon monoxide, and methanol, whereby the latter has to be added in amounts sufficient to replace the reacted alcohol and the alcohol which has been removed by azeotropic distillation. It is, therefore, of advantage to separate the methyl acrylate in a medium of carbon monoxide from the reaction mixture by rectification, and then to return the rectification residue, which contains the catalyst, to reaction.

The invention will be described more in detail in the following examples with reference to the accompanying drawings, in which.

Figure 1:
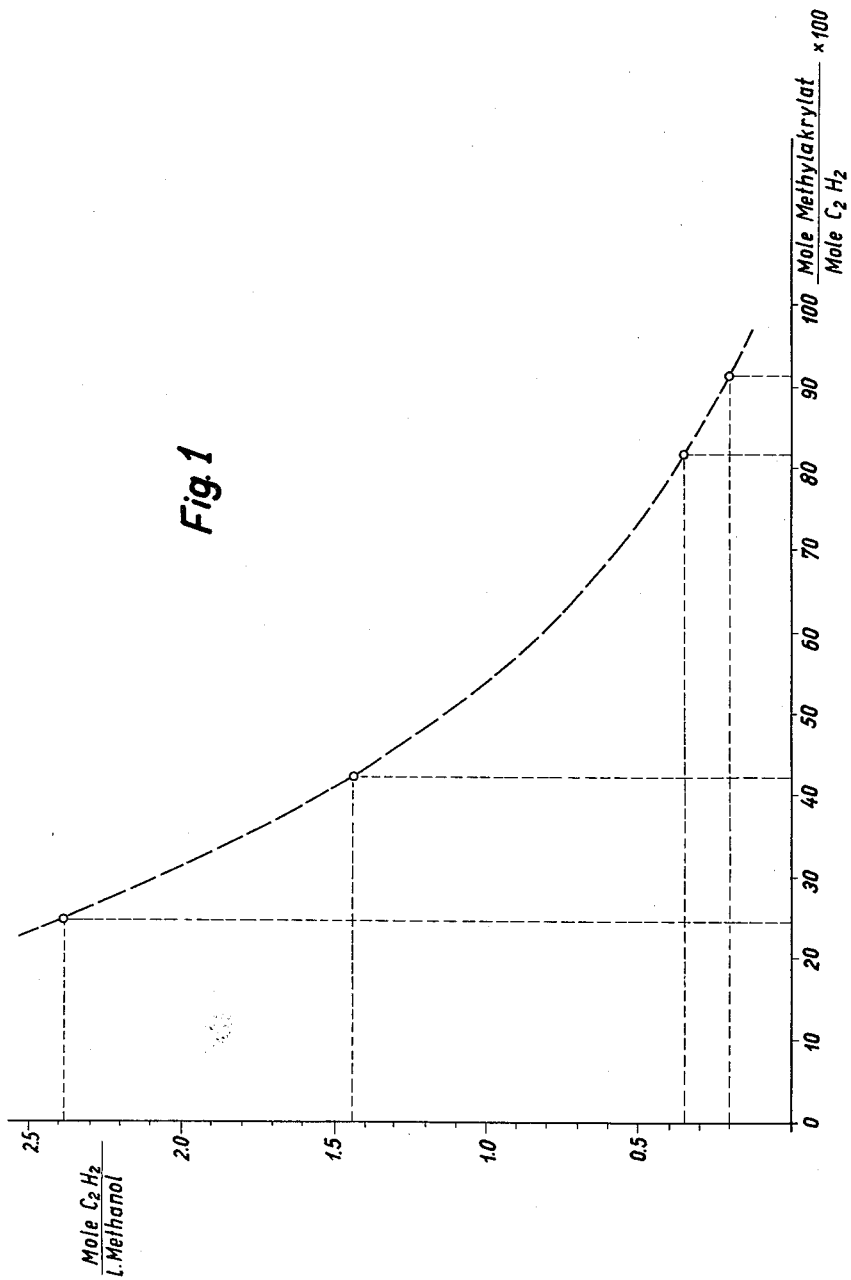
FIG. 1 is a graph showing the increase of the conversion of acetylene to methyl acrylate as a function of a decreasing mole ratio of acetylene to methanol.
Figure 2:
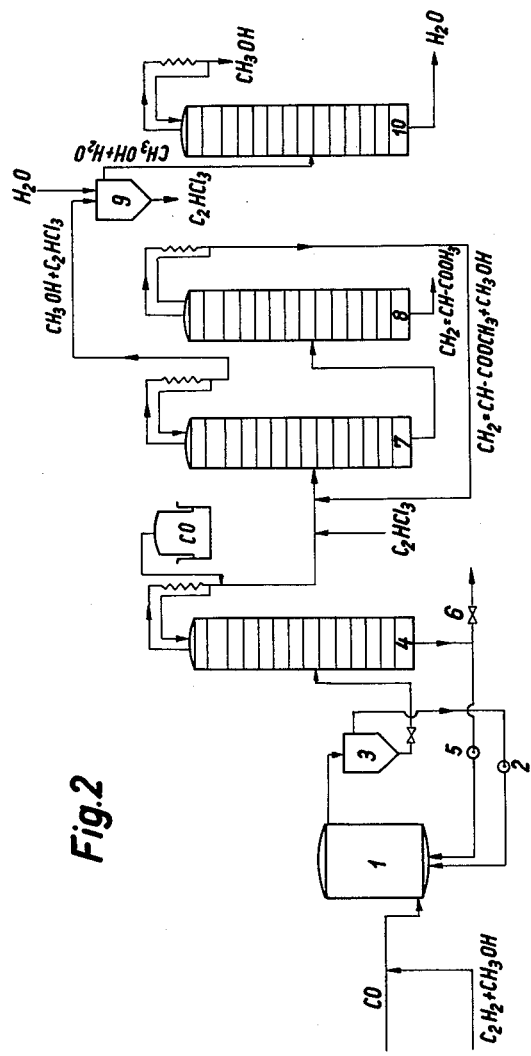
FIG. 2 is a diagrammatic illustration of an apparatus suitable for carrying out the reaction.

FIGS. 1 and 2 will be discussed in connectioin with the examples below.

Figure 3:
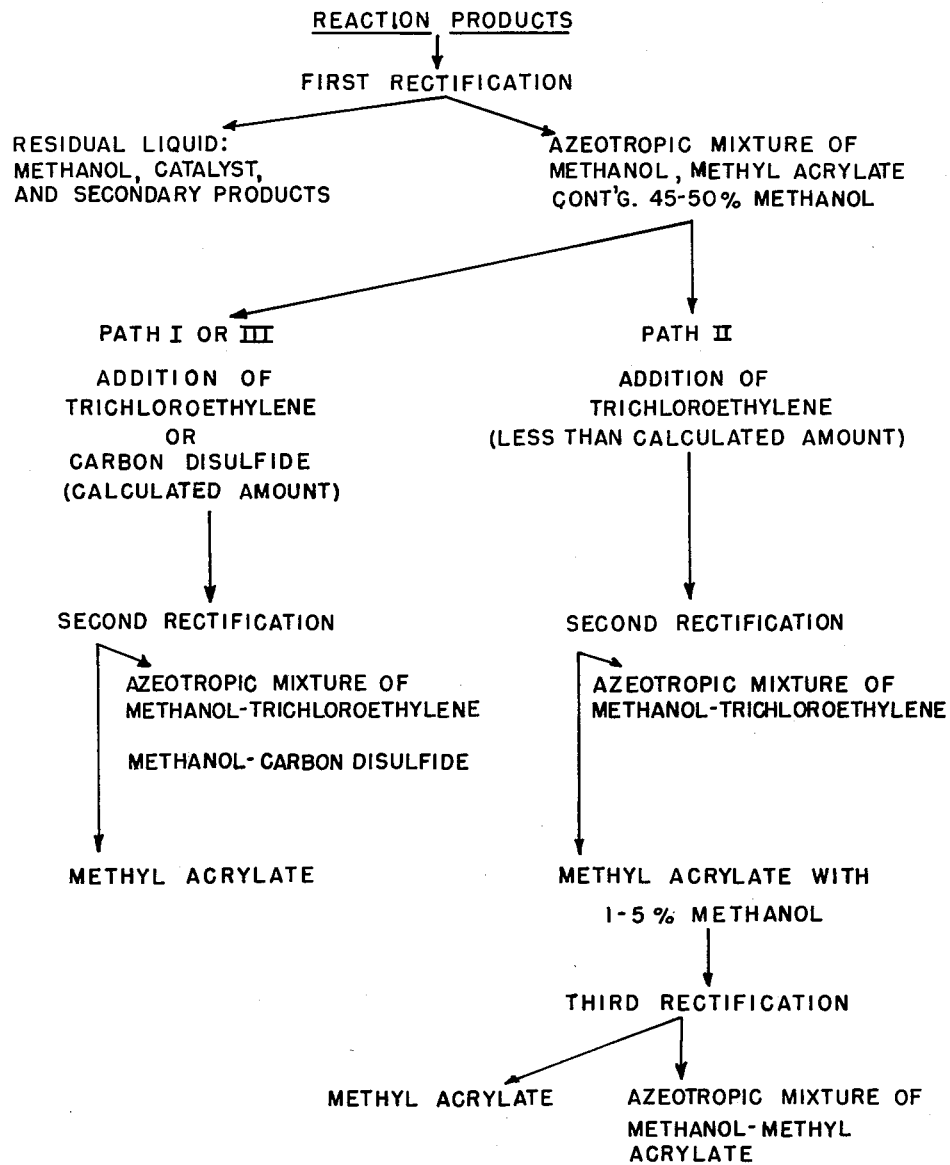
FIG. 3 is a diagram of suitable rectification procedures.

FIG. 3 shows various procedures for the rectification of the dilute methanolic solutions of the methyl acrylate. Preferably, the methyl acrylate is obtained by means of a first rectification, as an azeotropic mixture of methanol-methyl acrylate, which contains 45 to 50 percent of methanol. From such mixture, pure methyl acrylate is finally isolated by azeotropic distillation of the methanol in the presence of a liquid forming an azeotropic mixture with the methanol but not with the methylacrylate. A suitable liquid is trichloroethylene.

As trichloroethylene has a boiling point which is close to the boiling point of the methyl acrylate, it may be of advantage to apply the trichloroethylene in an amount which is smaller than the amount required to remove the entire methanol as azeotropic mixture (modification II of FIG. 3). The last traces of methanol may then by removed as azeotropic mixture with methyl acrylate.

Liquids may also be used which form azeotropic mixtures with methanol and methyl acrylate. Such separation is of advantage when the azeotropic mixture which contains the methyl acrylate, has a higher boiling point than the mixture containing the methanol, and when the possible ternary azeotropic mixtures contain only small amounts of methyl acrylate. Such a suitable liquid is carbon disulfide; in this case (modification III of FIG. 3), the entire methanol may be removed as azeotropic mixture (B.P.=37.65° C.).

Compared with the known methods, my novel process for the production of methyl acrylate presents the following advantages:

(1) The consumption of catalyst per kg. of produced methyl acrylate is very small; concentration of recycled cobalt carbonyl in the synthesis mixture in the order of magnitude of about 1 to 2 per thousand.

(2) The obtained methyl acrylate is practically free of methyl propionate, as shown by infra-red spectrometric analysis of the end product. Therefore, said methyl acrylate can be used for polymerization reactions without further purification.

*Example 1*

350 cm.³ of methanol were placed in a stainless steel autoclave, 0.5 g. of dicobalt octacarbonyl and 0.0732 mole of acetylene were dissolved therein and then carbon monoxide was introduced until a pressure of 209 atmospheres was reached. The autoclave was heated up to 105° C., and at that temperature an absorption of carbon monoxide was observed which was terminated after 1.5 hours. After cooling, the autoclave was discharged, and the liquid was analyzed and rectified. In this way, 5.75 g. of methyl acrylate were obtained in azeotropic mixture with methanol. The yield of methyl acrylate, calculated on introduced acetylene, was 91.5%.

Similar batches were treated in the same way whereby the starting concentration of the acetylene was varied. The obtained results are given in FIG. 1. The figure shows that only a concentration of at most 0.5 mole of acetylene per 1 liter of methanol gives yields of more than 70% and that the yields rapidly decrease with increasing concentrations of acetylene. Parallel with the increased conversion of acetylene to methyl acrylate for low $C_2H_2$ concentrations, there is a corresponding decrease of the formation of undesired by-products.

*Example 2*

1207 g. of methanol, 2.5 g. of dicobalt octacarbonyl, and 6.4 normal liters of acetylene 99% were introduced in a tilting autoclave of 2120 cm.$^3$. Carbon monoxide was then forced into the autoclave until a pressure of 173 atm. was obtained.

The autoclave was then heated at 107° C. At that temperature, a pressure reaction was observed which terminated after 45 min. The autoclave was cooled to room temperature, and a liquid reaction product was recovered which was analyzed under exclusion of air, and rectified.

In this way, 20 g. of methyl acrylate were obtained in azeotropic mixture with methanol, corresponding to a yield of 81%, calculated on the introduced acetylene. 828 g. of a liquid remained after rectification, which were returned into the autoclave in a medium of carbon monoxide after addition of 300 g. of methanol. Then, 7.33 normal liter of acetylene 99% and 177 atm. of carbon monoxide were introduced in the autoclave and heated to 110° C. At that temperature, a pressure drop was observed which stopped after 60 minutes. After cooling, the reaction products were discharged, analyzed, and rectified. In this way, 21.6 g. of methyl acrylate were obtained in azeotropic mixture with methanol. The yield, calculated on the introduced acetylene, was 77%. The catalyst contained in the distillation residue was still active as shown in a subsequent run with said liquid.

*Example 3*

The apparatus shown in FIG. 2 was used for a continuous operation of the reaction. A solution of acetylene in methanol, containing 0.4 mole of acetylene per liter of methanol, was continuously compressed with carbon monoxide to 200 atm. and introduced into the reactor 1, which contained a 2 per thousand solution of dicobalt octacarbonyl, and heated at 110° C. The solution leaving the reactor was separated in the separator 3 from the gaseous products, whereby the latter could be returned to the reactor by means of the pump 2. The liquid was then allowed to expand and introduced into the rectification column 4 which operated at a pressure of 1 atmosphere in a carbon monoxide medium. At the heat of the column, a mixture of methyl acrylate and methanol was obtained, which contained about 45 percent of methyl acrylate. The liquid remaining from the rectification contained the active catalyst, the excess methanol, small amounts of high boiling secondary products as well as traces of acrylate and was returned into the reactor by means of pump 5.

In order to avoid concentration of the secondary products, part of the recycled liquid was removed through valve 6. The dicobalt octacarbonyl discharged with said liquid was returned in the introduced solution of acetylene in methanol.

The methyl acrylate-methanol mixture was analyzed, and trichloroethylene was added in such an amount that a proportion of 1 mole of trichloroethylene to 2.68 moles of methanol was established. The mixture was introduced into the column 7 from the top of which a mixture of 62% of trichloroethylene and 38% of methanol was distilled off while methyl acrylate containing 2.64% of methanol was recovered from the sump. In a subsequent rectification, in column 8, said raw methyl acrylate was separated into a mixture of 55% methyl acrylate and 45% methanol, removed from the top of the column, and pure methyl acrylate recovered as bottoms. The mixture removed from the top of the column 8 may be introduced into column 7.

From the mixture trichloroethylene-methanol, the trichloroethylene was recovered by addition of 187 g. of water per 1000 g. of mixture and decantation in the separator 9. The supernatant layer contained methanol and water, and the methanol was recovered therefrom by rectification in the column 10.

I claim:

1. A process for the preparation of methyl acrylate containing less than 1 percent of methyl propionate, by the reactions of acetylene with carbon monoxide and methanol in the presence of a catalyst at a temperature of 80 to 200° C. and at a pressure of about 50 to 500 atmospheres in the presence of liquids in which the acetylene in the gas phase has a low partial pressure, said process comprising providing a solution containing at most 0.5 mole of acetylene per liter of methanol and 1 to 10 per thousand by weight of dicobalt actacarbonyl, forcing carbon monoxide into said solution until the reaction pressure is obtained, heating to reaction temperature, and recovering methyl acrylate from the obtained reaction product by rectification.

2. A process according to claim 1 wherein the rectification of the reaction product is carried out in a medium of carbon monoxide and the residue of the rectification, which contains the catalyst, is recycled into the reaction mixture.

3. A process according to claim 1 wherein said rectification comprises distilling off an azeotropic methanol-methyl acrylate mixture in a first rectification step, adding trichloroethylene to the distillate, and distilling off the methanol as azeotropic methanol-trichloroethylene mixture in a second rectification step.

4. A process according to claim 1 wherein said rectification comprises distilling off an azeotropic methanol-methyl acrylate mixture in a first rectification step, adding carbon disulfide to the distillate, and distilling off the methanol as azeotropic methanol-carbon disulfide mixture in a second rectification step.

5. A process for the preparation of methyl acrylate containing less than 1 percent of methyl propionate comprising providing a solution of acetylene in methanol containing as a catalyst 1 to 10 per thousand by weight of dicobalt octacarbonyl, said solution containing 0.1 to 0.5 mole of acetylene per liter of methanol, forcing carbon monoxide into said solution at a pressure of about 50 to 500 atmospheres, heating the solution to a temperature of 80 to 200° C., cooling the reaction mixture, distilling off in a first rectification step an azeotropic methanol-methyl acrylate mixture, adding to the distillate trichloroethylene in an amount corresponding to the major part of methanol present, distilling off the trichloroethylene and said major part of methanol as azeotropic mixture in a second rectification step, rectifying in a third step the residue of said second rectification step by distilling off an azeotropic methanol-methyl acrylate mixture, thereby recovering pure methyl acrylate as residue of said third rectification step.

No references cited.